US009246416B2

(12) United States Patent
Ichikawa

(10) Patent No.: US 9,246,416 B2
(45) Date of Patent: Jan. 26, 2016

(54) BRAKING APPARATUS FOR THREE-PHASE BRUSHLESS MOTOR, AND MOTOR-DRIVEN APPLIANCE PROVIDED WITH SAME

(71) Applicant: MAKITA CORPORATION, Anjo-shi, Aichi (JP)

(72) Inventor: Yoshitaka Ichikawa, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 348 days.

(21) Appl. No.: 13/895,890

(22) Filed: May 16, 2013

(65) Prior Publication Data

US 2013/0307446 A1   Nov. 21, 2013

(30) Foreign Application Priority Data

May 18, 2012   (JP) .................................. 2012-114838

(51) Int. Cl.
*H02P 3/12* (2006.01)
*H02P 3/06* (2006.01)
*H02P 3/22* (2006.01)
*H02P 6/24* (2006.01)

(52) U.S. Cl.
CPC .. *H02P 3/06* (2013.01); *H02P 3/22* (2013.01); *H02P 6/24* (2013.01)

(58) Field of Classification Search
USPC ................................................ 318/375–380
See application file for complete search history.

(56) References Cited

U.S. PATENT DOCUMENTS

| 5,083,067 | A | 1/1992 | Soushin et al. |
| 6,118,241 | A | 9/2000 | Kazlauskas |

| 2005/0248361 | A1 | 11/2005 | O'Gorman et al. |
| 2006/0284581 | A1 | 12/2006 | Mullin et al. |
| 2010/0288067 | A1* | 11/2010 | Hofmann et al. .......... 74/490.03 |
| 2011/0098887 | A1 | 4/2011 | Fujimoto |
| 2013/0218417 | A1 | 8/2013 | Suzuki |

FOREIGN PATENT DOCUMENTS

| EP | 1 596 491 A2 | 11/2005 |
| JP | A-3-74194 | 3/1991 |
| JP | H07-184391 A | 7/1995 |

(Continued)

OTHER PUBLICATIONS

Extended European Search Report issued in European Application No. 13168209.8 issued May 19, 2014.
Sep. 15, 2015 Office Action issued in Japanese Application No. 2012-114838.

*Primary Examiner* — Bentsu Ro
(74) *Attorney, Agent, or Firm* — Oliff PLC

(57) ABSTRACT

A braking apparatus for a three-phase brushless motor is provided in a motor-driven appliance, and includes a switching circuit having six switching elements and a brake control device. The brake control device executes two-phase short-circuit control in braking control in which a braking force is generated in the motor. In the two-phase short-circuit control, an on/off state of each of the switching elements is set in such a manner that two out of three conduction paths constituting one of a positive electrode side conduction path that connects three terminals of the motor and a positive electrode side of a direct current power source and a negative electrode side conduction path that connects the three terminals and a negative electrode side of the power source are in a conducting state and other of the three conduction paths is in a nonconducting state.

11 Claims, 8 Drawing Sheets

(56) References Cited

FOREIGN PATENT DOCUMENTS

| | | | |
|---|---|---|---|
| JP | H07-184392 A | 7/1995 | |
| JP | H07-184394 A | 7/1995 | |
| JP | H11-178389 A | 7/1999 | |
| JP | 2006-141110 A | 6/2006 | |
| JP | 2012-071759 A | 4/2012 | |
| WO | 2010/084623 A1 | 7/2010 | |

* cited by examiner

FIG.6A

| HALL SIGNAL ANGLE | DELAY ANGLE | DRIVE SIGNAL | | | | | |
|---|---|---|---|---|---|---|---|
| | | U-PHASE | | V-PHASE | | W-PHASE | |
| | | H-SIDE | L-SIDE | H-SIDE | L-SIDE | H-SIDE | L-SIDE |
| 0 | 20 | OFF | OFF | ON | OFF | ON | OFF |
| 60 | 20 | OFF | ON | OFF | ON | OFF | OFF |
| 120 | 20 | ON | OFF | OFF | OFF | ON | OFF |
| 180 | 20 | OFF | OFF | OFF | ON | OFF | ON |
| 240 | 20 | ON | OFF | ON | OFF | OFF | OFF |
| 300 | 20 | OFF | ON | OFF | OFF | OFF | ON |

FIG.6B

| HALL SIGNAL ANGLE | DELAY ANGLE | DRIVE SIGNAL | | | | | |
|---|---|---|---|---|---|---|---|
| | | U-PHASE | | V-PHASE | | W-PHASE | |
| | | H-SIDE | L-SIDE | H-SIDE | L-SIDE | H-SIDE | L-SIDE |
| 0 | 20 | OFF | OFF | OFF | OFF | OFF | OFF |
| 60 | 20 | OFF | ON | OFF | ON | OFF | OFF |
| 120 | 20 | OFF | OFF | OFF | OFF | OFF | OFF |
| 180 | 20 | OFF | OFF | OFF | ON | OFF | ON |
| 240 | 20 | OFF | OFF | OFF | OFF | OFF | OFF |
| 300 | 20 | OFF | ON | OFF | OFF | OFF | ON |

FIG.6C

| HALL SIGNAL ANGLE | DELAY ANGLE | DRIVE SIGNAL | | | | | |
|---|---|---|---|---|---|---|---|
| | | U-PHASE | | V-PHASE | | W-PHASE | |
| | | H-SIDE | L-SIDE | H-SIDE | L-SIDE | H-SIDE | L-SIDE |
| 0 | 0 | OFF | OFF | OFF | OFF | OFF | OFF |
| 60 | 0 | OFF | ON | OFF | ON | OFF | OFF |
| 120 | 40 | OFF | OFF | OFF | OFF | OFF | OFF |
| 180 | 0 | OFF | OFF | OFF | OFF | OFF | OFF |
| 240 | 0 | OFF | OFF | OFF | OFF | OFF | OFF |
| 300 | 0 | OFF | OFF | OFF | OFF | OFF | OFF |

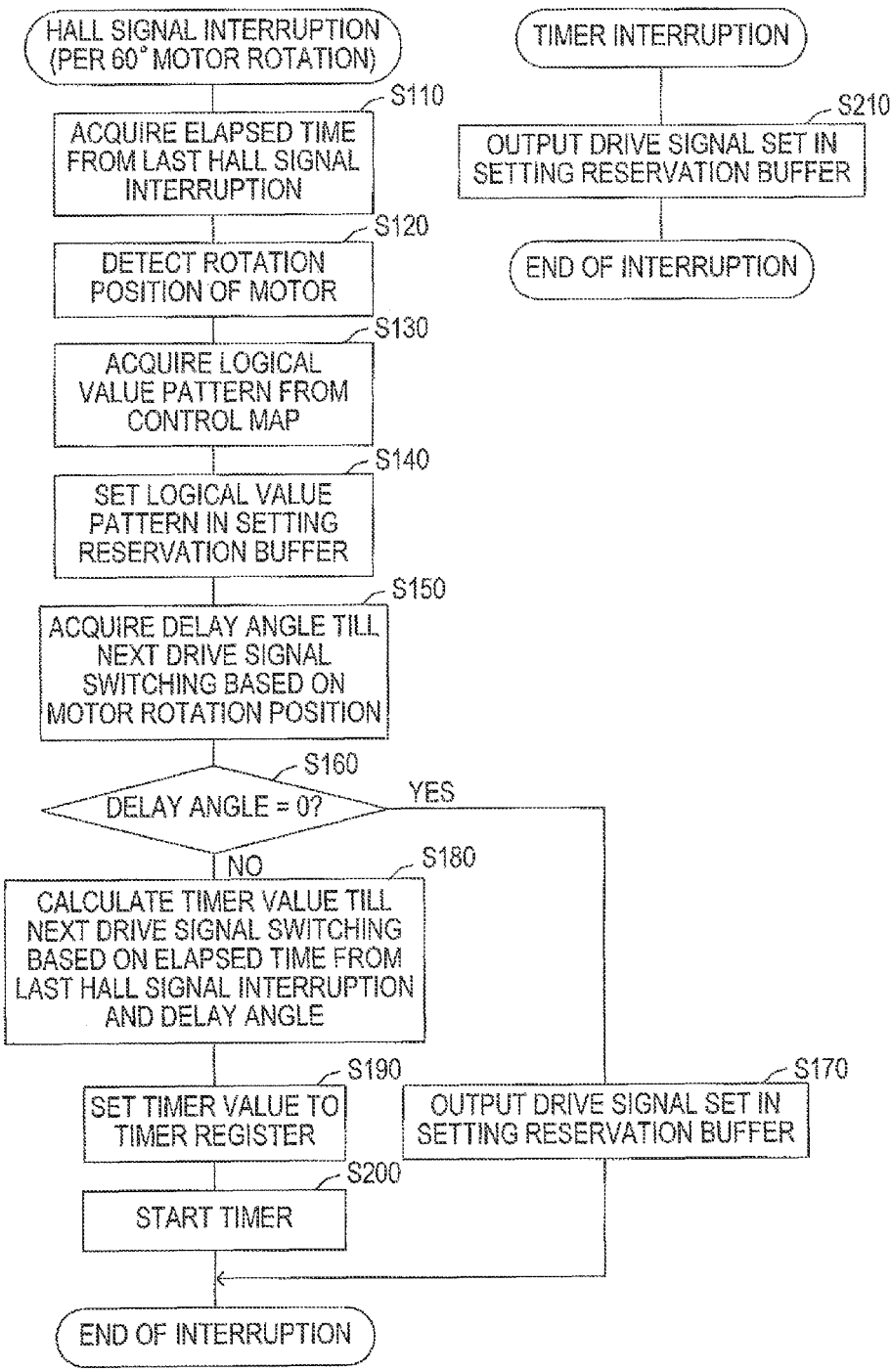

BRAKING APPARATUS FOR THREE-PHASE BRUSHLESS MOTOR, AND MOTOR-DRIVEN APPLIANCE PROVIDED WITH SAME

CROSS-REFERENCE TO RELATED APPLICATIONS

This application claims the benefit of Japanese Patent Application No. 2012-114838 filed May 18, 2012 in the Japan Patent Office, the disclosure of which is incorporated herein by reference.

BACKGROUND

The present invention relates to a braking apparatus for a brushless motor that generates a braking force by causing a short circuit between terminals of the brushless motor, and a motor-driven appliance provided with the braking apparatus.

For example, in electrical equipment disclosed in Japanese Unexamined Patent Application Publication No. 3-74194, upon decelerating or stopping rotation of a three-phase brushless motor, a so-called short-circuit brake is used that causes a short circuit between all terminals of the motor so as to generate a braking force.

In the short-circuit brake, for example, three switching elements (so-called low-side switches) provided in a conduction path between each terminal of the motor and a negative electrode of a direct current power source are turned on, and the other three switching elements (so-called high-side switch) provided in a conduction path between each terminal of the motor and a positive electrode of the direct current power supply are turned off, thereby causing the three-phase brushless motor to generate a braking force.

According to the short-circuit brake, it is possible to brake (decelerate or stop) the motor merely by turning on/off the switching elements used in conduction control of the motor.

SUMMARY

In the above-described short-circuit brake, however, a braking force is generated by flowing a current to all phases of the motor. Thus, the braking force becomes so large that a force applied to electrical equipment by the braking force is large, and defects sometimes occur in the electric equipment.

For example, in a rechargeable grass mower that rotates a rotary blade by a three-phase brushless motor, if rotation of the motor is stopped by the above-described short-circuit brake, there is a problem in which the braking force is so strong that nuts, screws, and the like used to mount the rotary blade are loosened.

Further, if braking is performed by the above-described short-circuit brake, for example, in a rechargeable circular saw that rotates a circular saw at high speed by a three-phase brushless motor, a braking force is so strong that there are also problems in which the braking reaction is so large that the feeling of use by a user is deteriorated.

In one aspect of the present invention, it is desirable to be able to suppress the braking force generated in the brushless motor by the short-circuit brake.

One aspect of the present invention provides a braking apparatus for a three-phase brushless motor that is provided in a motor-driven appliance and has three terminals. The braking apparatus includes a switching circuit and a brake control device. The switching circuit includes six switching elements. The six switching elements are provided in a positive electrode side conduction path that connects the three terminals with a positive electrode side of a direct current power source and in a negative electrode side conduction path that connects the three terminals with a negative electrode side of the direct current power source, and are adapted to conduct or cut off each of the positive electrode side conduction path and the negative electrode side conduction path. The brake control device is configured to perform braking control in which a braking force is generated in the three-phase brushless motor by controlling an on/off state of the six switching elements when one of a stop command and a deceleration command of the three-phase brushless motor is input upon rotation of the three-phase brushless motor. The brake control device is further configured to perform two-phase short-circuit control in which an on/off state of each of the six switching elements is set in such a manner that two out of the three conduction paths constituting one of the positive electrode side conduction path and the negative electrode side conduction path are in a conducting state and the other of the three conduction paths is in a non-conducting state in the braking control.

In the braking apparatus as such, the braking force generated in the three-phase brushless motor can be reduced, and the occurrence of defects in a motor-driven appliance due to excessive braking force can be inhibited.

Upon execution of the two-phase short-circuit control of the present invention, a period is produced during which, although a current that varies depending on the rotation of the three-phase brushless motor flows to two phases of the three-phase brushless motor, a current does not flow to a remaining phase that is not used for the short-circuit control.

During this period, current changes of the two phases cross at a point where current is zero (zero crossing point). That is, during braking by the two-phase short-circuit control, a timing occurs at which the current flowing to all phases of the three-phase brushless motor is zero.

Therefore, the brake control device may be configured to detect a timing at which the current that flows to each phase of the three-phase brushless motor is zero as an end timing of the two-phase short-circuit control based on a rotation state of the three-phase brushless motor, and end the two-phase short-circuit control at the detected end timing.

That is, in the three-phase short-circuit control, a current is certainly flowing to any of the phases of the three-phase brushless motor during braking. Therefore, if the three conduction paths that have been in a conducting state until then are switched to a cut-off state for ending the three-phase short-circuit control, high voltage is generated at both ends of a winding through which the current had been flowing at the timing.

The high voltage is regenerated as a regenerative energy at a direct current power supply side, via diodes (parasitic diodes of FETs, etc.) connected in parallel with the switching elements connected to the corresponding terminals. If the regenerative energy (in other words, generated voltage) is large, the switching elements can be damaged.

In particular, in the three-phase brushless motor, when impedance of the conduction path and on-resistance of the switching elements are lowered in order to increase efficiency of motor characteristics when heavy load is applied, a brake current when short-circuit braking is performed is large. Further, regenerative energy to be generated at an end of short-circuit braking is also large.

Therefore, when the three-phase brushless motor is braked using the short-circuit brake by a conventional three-phase short-circuit control, it is necessary to use switching elements having high voltage resistance, so as not to be damaged by the regenerative energy (high voltage) generated at the end of short-circuit braking.

In contrast, in the two-phase short-circuit control, a timing at which currents in all phases of the three-phase brushless motor are zero is present. Therefore, if the two-phase short-circuit control is terminated at the timing, it is possible to set the regenerative energy generated at the end timing to zero.

Thus, if the brake control device is configured as described above, it is possible to reduce voltage resistance of the switching elements, and thereby to reduce costs of the braking apparatus.

Since the timing at which a current flowing to each phase of the three-phase brushless motor is zero varies depending on a rotation state (rotation position and rotation speed) of the three-phase brushless motor, the end timing of the two-phase short-circuit control can be set based on the rotation state of the three-phase brushless motor.

The rotation state of the three-phase brushless motor may be detected using a rotation sensor (such as a Hall element or encoder, etc.) for detecting the rotation position that is usually provided in a three-phase brushless motor.

Also, the rotation state of the three-phase brushless motor may be detected by detecting an induced voltage generated in each phase upon braking or a current flowing to each phase.

The braking apparatus may include a rotation position detecting device that is configured to detect a rotation position of the three-phase brushless motor. The brake control device may be configured to perform two-phase short-circuit intermittent control in which the two-phase short-circuit control is intermittently performed in accordance with the rotation position of the three-phase brushless motor detected by the rotation position detecting device in the braking control, and, when the two-phase short-circuit control is not performed, all of the positive electrode side and negative electrode side conduction paths are brought into a non-conducting state.

In this case, by intermittently performing the two-phase short-circuit control, it is possible to inhibit a current from flowing to the phase that does not correspond to the two conduction paths to be conducted and to suppress a current that flows through the two conduction paths that have been conducted.

That is, by adjusting a period to stop the two-phase short-circuit control by the two-phase short-circuit intermittent control, it is possible to arbitrarily set the braking force generated upon braking of the three-phase brushless motor.

The brake control device may be configured to perform two-phase short-circuit switching control in which the two conduction paths that are brought into a conducting state in the two-phase short-circuit control are switched in accordance with the rotation position of the three-phase brushless motor detected by the rotation position detecting device.

In this case, by switching a combination of the two conduction paths controlled to be in a conducting state in the two-phase short-circuit control, it is possible to set the braking force generated in the three-phase brushless motor to be greater than the braking force in the two-phase short-circuit intermittent control, and to be smaller than the braking force in the case wherein the two-phase short-circuit control is continuously carried out.

The brake control device may be configured to perform the two-phase short-circuit switching control by selecting the two conduction paths to be brought into a conducting state in the two-phase short-circuit control from among the three conduction paths constituting one of the positive electrode side conduction path and the negative electrode side conduction path, and switching a combination of the conduction paths to be selected in accordance with the rotation position of the three-phase brushless motor.

The brake control device may be configured to perform the two-phase short-circuit switching control by alternately selecting the two conduction paths to be brought into a conducting state in the two-phase short-circuit control from among the three conduction paths constituting the positive electrode side conduction path and the three conduction paths constituting the negative electrode side conduction path, in accordance with the rotation position of the three-phase brushless motor.

The brake control device may be configured to vary the braking force to be generated in the three-phase brushless motor, by changing an execution period of the two-phase short-circuit control in accordance with a rotation state of the three-phase brushless motor.

In this case, it is possible to optimally control the braking force generated in the three-phase brushless motor.

That is, for example, when the rotation speed of the three-phase brushless motor is high, it is possible to suppress the braking force to reduce deceleration shock generated upon braking. When the rotation speed of the three-phase brushless motor is low, it is possible to increase the braking force to immediately stop the three-phase brushless motor without generation of deceleration shock.

The brake control device may be configured to be able to perform three-phase short-circuit control in which an on/off state of each of the six switching elements in the switching circuit is set in such a manner that the three conduction paths constituting one of the positive electrode side conduction path and the negative electrode side conduction path are brought into a conducting state and the other of three conduction paths are brought into a non-conducting state in the braking control. The brake control device may be further configured to control the braking force generated in the three-phase brushless motor by executing the three-phase short-circuit control and the two-phase short-circuit control in combination, upon braking the three-phase brushless motor.

Also in this case, the two-phase short-circuit control may be executed by switching over the control methods such as the two-phase short-circuit intermittent control, the two-phase short-circuit switching control, and so on.

In this manner, it is possible to brake the three-phase brushless motor by an optimum braking force in accordance with the rotation state at the time.

A motor-driven appliance in another aspect of the present invention includes the above-described brushless motor and braking apparatus.

The motor-drive appliance configured as such can exhibit the same effect as the above-described braking apparatus since the motor-driven appliance is provided with the above-described braking apparatus.

BRIEF DESCRIPTION OF THE DRAWINGS

The present invention will now be described below by way of example, with reference to the accompanying drawings in which:

FIGS. 6A to 6C are explanatory diagrams showing control maps used in the two-phase short-circuit brakes illustrated in FIGS. 3 to 5;

FIGS. 7A and 7B are flowcharts showing processes executed in order to implement a function as a brake control unit in a control circuit.

DETAILED DESCRIPTION OF THE PREFERRED EMBODIMENTS

In the present embodiment, the present invention is applied to a motor drive device 10 used to drive a three-phase brushless motor (hereinafter, simply referred to as the motor) 2 that serves as a power source in electrical equipment 100, including a motor-driven appliance such as a rechargeable mower, rechargeable circular saw, and the like.

Figure 1:
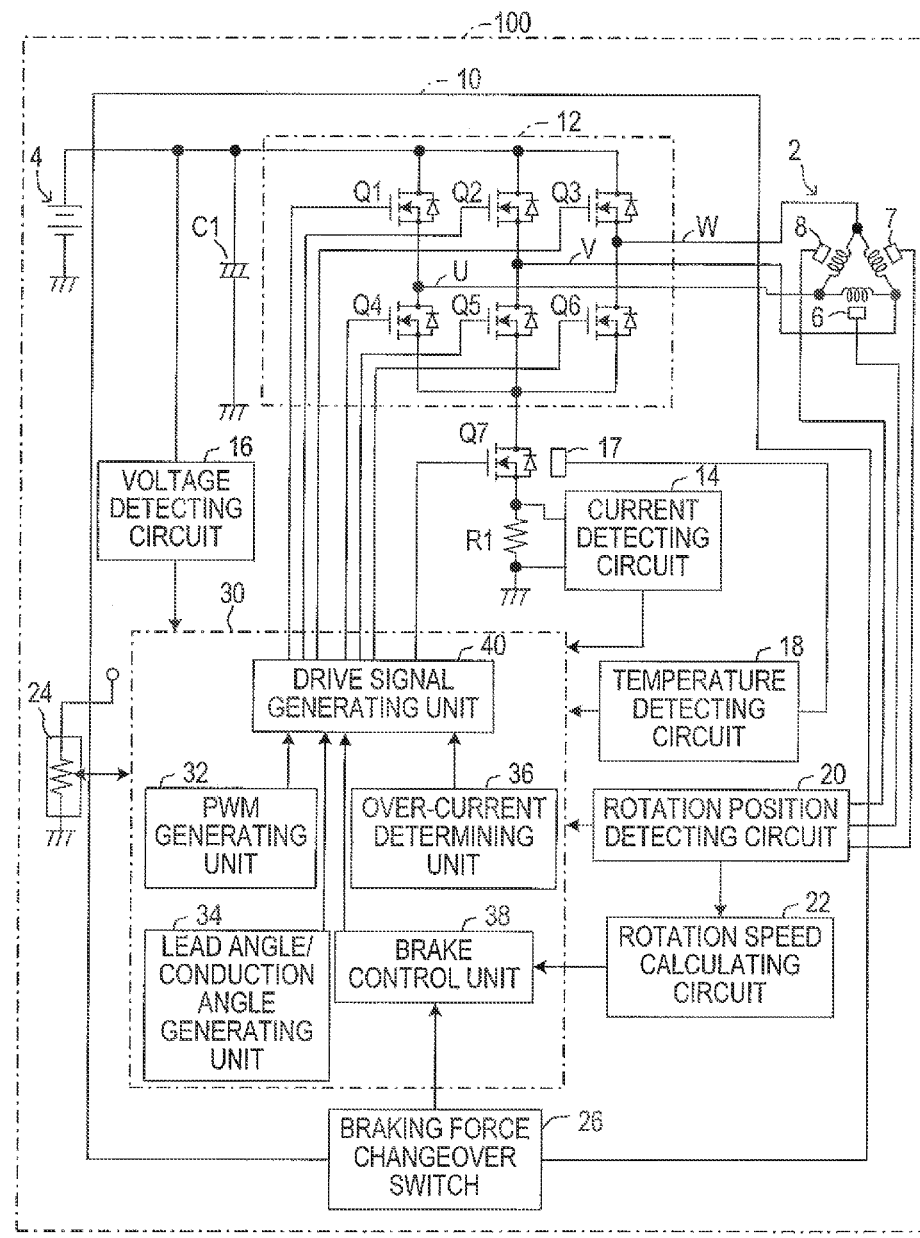
FIG. 1 is a block diagram showing a configuration of an entire motor drive device of one embodiment.

As shown in FIG. 1, the motor drive device 10 of the present embodiment is provided with a power supply line and a ground line. The power supply line is connected to a positive electrode side of a battery 4 that is a direct current power source. The ground line is connected to a negative electrode side of the battery 4.

Between the power supply line on the positive electrode side and the ground line on the negative electrode side, a switching circuit 12 is provided for controlling a current flowing to each phase of U, V, and W of the motor 2.

The switching circuit 12 includes three switching elements Q1, Q2 and Q3 (U-phase high-side switch Q1, V-phase high-side switch Q2, and W-phase high-side switch Q3), and three switching elements Q4, Q5 and Q6 (U-phase low-side switch Q4, V-phase low-side switch Q5, and W-phase low-side switch Q6). The switching elements Q1, Q2 and Q3 are provided on a conduction path on the positive electrode side between terminals of the U-, V-, and W-phases of the motor 2 and the power supply line. The switching elements Q4, Q5 and Q6 are provided on a conduction path on the negative electrode side between the terminals of the U-, V-, and W-phases of the motor 2 and the ground line.

Further, in the conduction path on the negative electrode side between the switching circuit 12 and the ground line (that is, between the switching elements Q4 to Q6 on the negative electrode side and the ground line), a switching element (current cut-off switch) Q7 for cutting off currents, and a resistor R1, are provided.

To both ends of the resistor R1, a current detecting circuit 14 is connected, which detects a current flowing to the motor 2 from a voltage between the both ends of the resistor R1. A temperature sensor 17 having characteristics that change depending on a temperature of the current cut-off switch Q7 is provided in a vicinity of the current cut-off switch Q7.

In addition, to the temperature sensor 17, a temperature detecting circuit 18 is connected, which detects a temperature of the current cut-off switch Q7 through the temperature sensor 17. Detection signals from the temperature detecting circuit 18 are input to a control circuit 30 together with detection signals from the current detecting circuit 14.

In the present embodiment, each of the above described switching elements Q1 to Q7 is an n-channel MOSFET. However, the switching elements of the present invention are not limited to an n-channel MOSFET.

In addition, between the power supply line leading to the switching circuit 12 from the positive electrode side of the battery 4 (conduction path on the positive electrode side) and the ground line, a capacitor C1 for smoothing, and a voltage detecting circuit 16 that detects a voltage (that is, battery voltage) between the lines, are provided.

Further, the motor drive device 10 also includes a rotation position detecting circuit 20 and a rotation speed calculating circuit 22. The rotation position detecting circuit 20 detects a rotation position of the motor 2. The rotation speed calculating circuit 22 calculates a rotation speed of the motor 2 based on the rotation position detected by the rotation position detecting circuit 20.

Detection signals from the voltage detecting circuit 16, the rotation position detecting circuit 20, and the rotation speed calculating circuit 22, are also input to the control circuit 30.

The rotation position detecting circuit 20 detects the rotation position (in other words, rotation angle) of the motor 2 based on detection signals (Hall signals) from three Hall sensors 6, 7 and 8 for rotation position detection provided in the motor 2.

That is, the Hall sensors 6, 7 and 8 are arranged at a 120-degree interval around a rotor of the motor 2, and output U-, V-, and W-phase Hall signals which rise or fall each time the rotor rotates 180 degrees.

The rotation position detecting circuit 20 performs waveform shaping of the U-, V-, and W-phase Hall signals from the Hall sensors 6, 7 and 8, thereby generating pulse-like Hall signals (see FIGS. 2 to 4) of which positive and negative are reversed per 180-degree rotation of the rotor, to detect the rotation position of the motor 2 (rotor) at a 60-degree interval from an edge of each Hall signal. Furthermore, the rotation speed calculating circuit 22 calculates the rotation speed of the motor 2 from an edge interval of each Hall signal.

Next, the control circuit 30 is a microcomputer that includes not shown CPU, ROM and RAM, in the present embodiment. According to a state of an operating unit 24 operated by a user, drive control and braking control of the motor 2 are performed.

In other words, the control circuit 30 determines that a drive command is input when the operating unit 24 is operated by the user, and drives the motor 2 in accordance with an amount of operation of the operating unit 24. When the operation of the operating unit 24 by the user is complete, the control circuit 30 determines that a deceleration command or stop command is input, and puts a brake on the motor 2.

In order to perform drive control and braking control of the motor 2 as above, the control circuit 30 executes various control programs stored in the ROM, and implements functions as a PWM generating unit 32, a lead angle/conduction angle generating unit 34, an over-current determining unit 36, a brake control unit 38, and a drive signal generating unit 40, all of which are shown in FIG. 1.

Here, based on a conduction current flowing to the motor 2 detected by the current detecting circuit 14 and the rotation position of the motor 2 detected by the rotation position detecting circuit 20, the lead angle/conduction angle generating unit 34 generates a conduction command representing a lead angle/conduction angle during drive of the motor 2, referring to a lead angle/conduction angle map stored in the ROM in advance, and outputs the conduction command to the drive signal generating unit 40.

Further, the PWM generating unit 32 calculates a driving duty ratio for PWM control of the motor 2, generates a PWM command that represents the driving duty ratio, and outputs the PWM command to the drive signal generating unit 40.

Then, the drive signal generating unit 40 turns on the current cut-off switch Q7, when the operating unit 24 is operated and drive control of the motor 2 is performed. Further, in accordance with the conduction command from the lead angle/conduction angle generating unit 34, the drive signal generating unit 40 generates drive signals for turning on one of the switching elements (high-side switches) Q1 to Q3 on the positive electrode side and one of the switching elements (low-side switches) Q4 to Q6 on the negative electrode side that constitute the switching circuit 12, and outputs the drive signals to the switching circuit 12.

Further, the drive signal generating unit 40 outputs the drive signals for one of a group of the high-side switches and a group of the low-side switches as PWM signals having a driving duty ratio corresponding to the PWM command from the PWM generating unit 32, thereby duty driving the switches.

As a result, a current corresponding to the driving duty ratio flows to each of the U-, V-, and W-phases of the motor 2. The motor 2 rotates at a rotation speed corresponding to the amount of operation of the operating unit 24.

In addition, the over-current determining unit 36, when a drive current of the motor 2 detected by the current detecting circuit 14 exceeds a threshold for over-current determination, stops output of the drive signals from the drive signal generating unit 40 (in other words, drive of the motor 2).

Further, the control circuit 30, based on the detection signals from the voltage detecting circuit 16 and the temperature detecting circuit 18, monitors battery voltage and temperature of the current cut-off switch Q7, and stops drive control of the motor 2 when the battery voltage is low or the temperature of the current cut-off switch Q7 is elevated.

Next, the brake control unit 38 is a control block that implements a function as an example of the braking apparatus according to the present invention. When operation of the operating unit 24 by the user is finished upon execution of the drive control of the motor 2, the brake control unit 38 determines that a deceleration command or a stop command is input and generates a braking force in the motor 2.

Specifically, the brake control unit 38 turns off the current cut-off switch Q7 via the drive signal generating unit 40, and selectively turns on a part of the switching elements Q1 to Q6 in the switching circuit 12 so as to connect between terminals of the motor 2. In this way, a braking force is generated in the motor 2.

Figure 2:
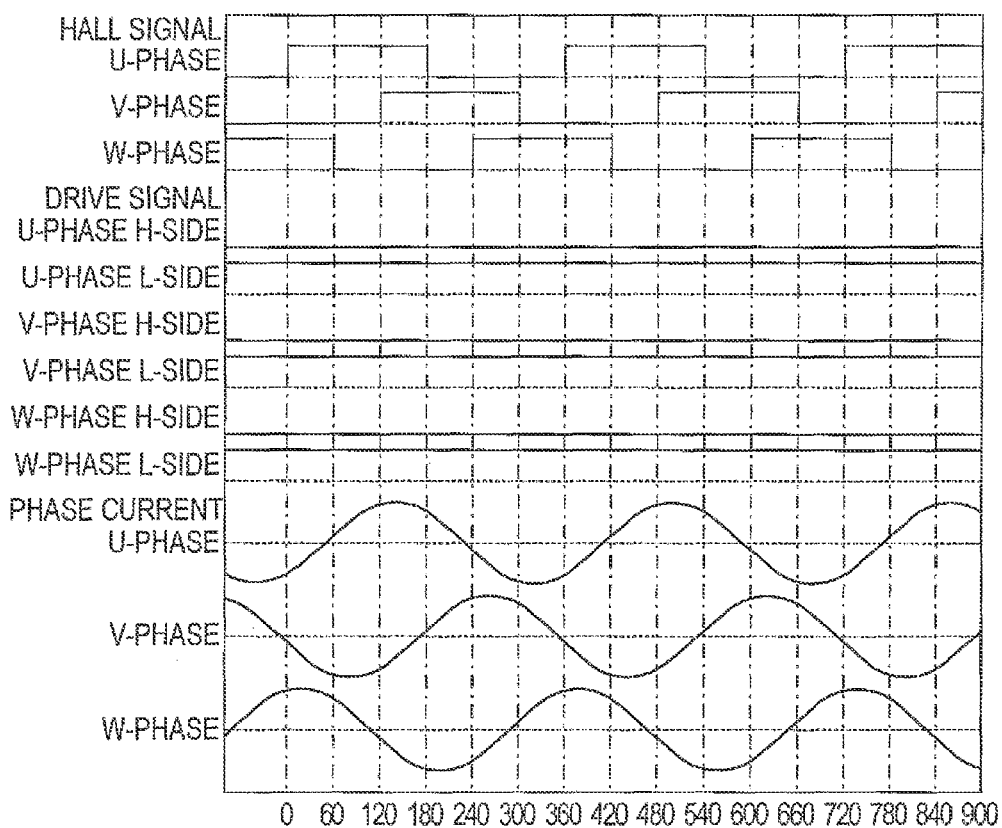
FIG. 2 is an explanatory diagram showing changes in Hall signals, drive signals, and phase currents, in an all-phase short-circuit brake.

As above, as a short-circuit brake that connects between the terminals of the U-, V-, and W-phases of the motor 2 so as to generate a braking force, an all-phase short-circuit brake is known, which controls the switching elements Q1 to Q3 on the positive electrode side (H-side) of the U-, V-, and W-phases of the motor 2 into an off state, and the switching elements Q4 to Q6 on the negative electrode side (L-side) into an on state, as shown in FIG. 2.

However, in the all-phase short-circuit brake, a current (brake current) flows to each of the U-, V-, and W-phases of the motor 2 in accordance with rotation of the motor 2. Then, a braking force corresponding to the brake current is generated. Thus, depending on a rotation state (such as a rotation speed) of the motor 2, the braking force becomes so large that defects may occur to the electrical equipment 100.

Figure 3:
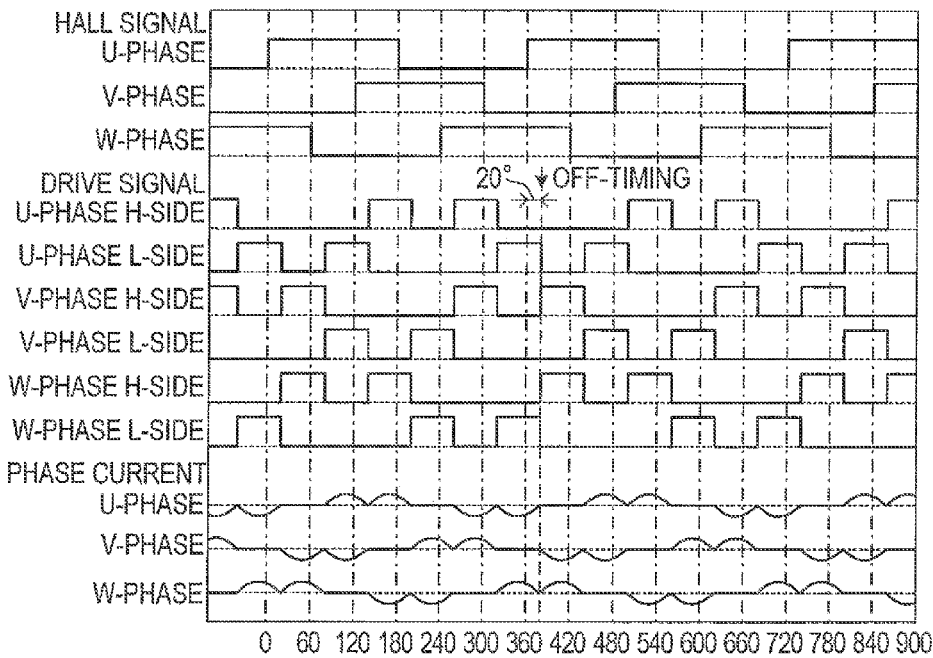
FIG. 3 is an explanatory diagram showing changes in Hall signals, drive signals, and phase currents, in a two-phase short-circuit brake by H/L short-circuit phase switching control.
Figure 4:
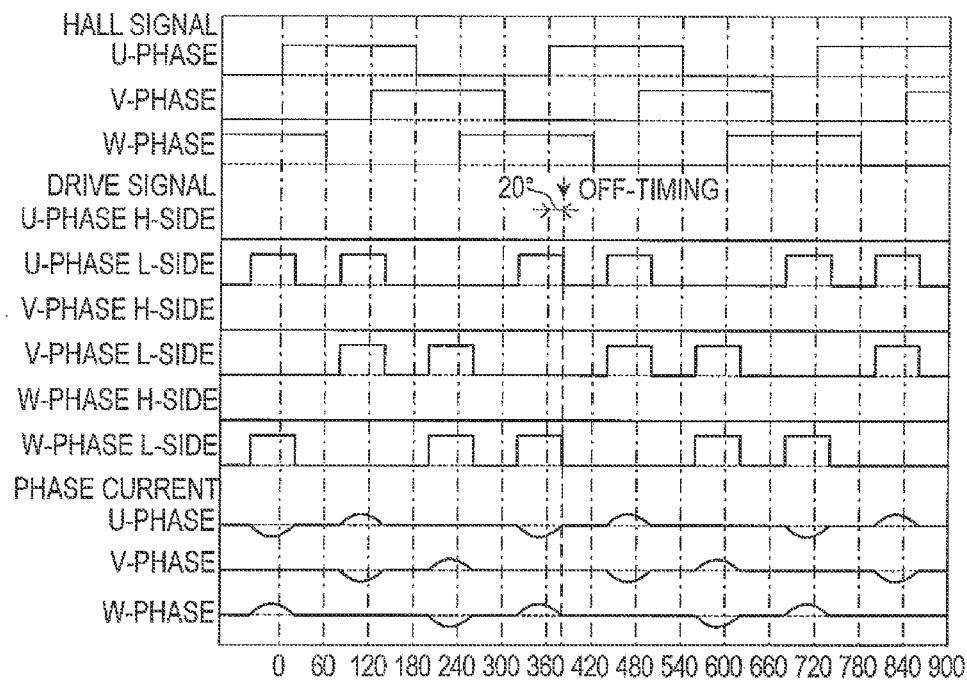
FIG. 4 is an explanatory diagram showing changes in Hall signals, drive signals, and phase currents, in a two-phase short-circuit brake by L-side short-circuit phase switching control.
Figure 5:
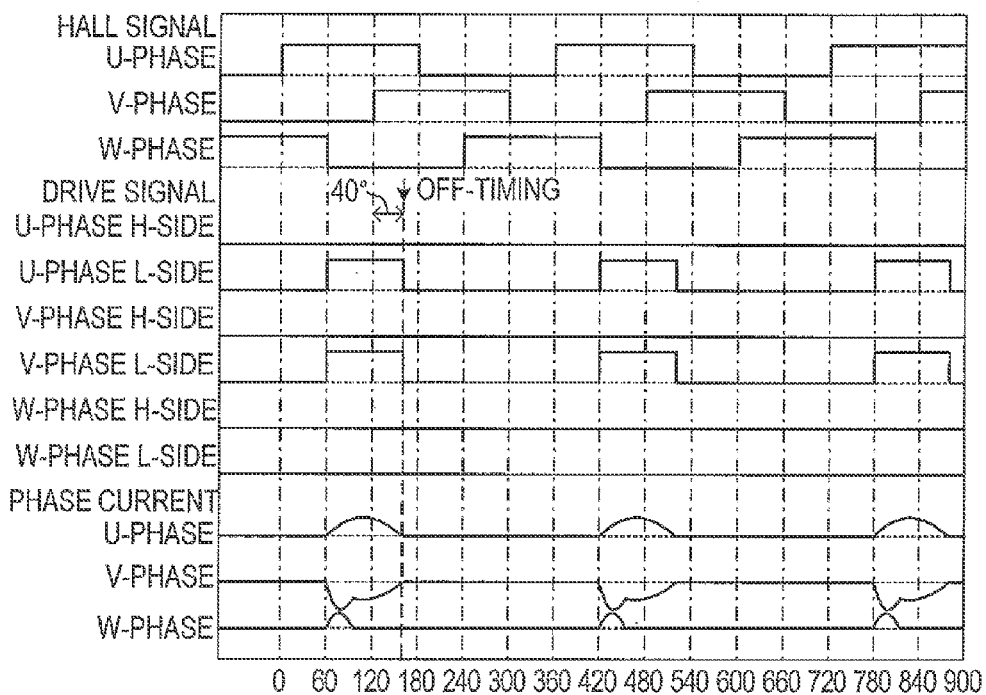
FIG. 5 is an explanatory diagram showing changes in Hall signals, drive signals, and phase currents, in a two-phase short-circuit brake by L-side UV-phase short-circuit control.

Therefore, in the present embodiment, the brake control unit 38 executes one of two-phase short-circuit brakes shown in FIGS. 3 to 5, in addition to the all-phase short-circuit brake shown in FIG. 2, so as to be able to put a brake on the motor 2 with a desired braking force.

That is, the motor drive device 10 of the present embodiment is provided with a braking force changeover switch 26. The braking force changeover switch 26 switches the braking force upon braking of the motor 2 into four stages from a maximum braking force by the all-phase short-circuit brake to braking forces by the two-phase short-circuit brakes shown in FIGS. 3 to 5, in response to switching operation by the user.

Then, the brake control unit 38 generates a braking force in the motor 2 by the short-circuit brake set via the braking force changeover switch 26, thereby braking the motor 2.

Here, the two-phase short-circuit brake shown in FIG. 3 is achieved by H/L short-circuit phase switching control. In the H/L short-circuit phase switching control, a braking force is generated in the motor 2 according to the steps below.

(i) The switching elements in the switching circuit 12 are turned on so as to alternately switch over the conduction path to be conducted between the conduction path on the positive electrode side (H-side) and the conduction path on the negative electrode side (L-side), per 60-degree rotation of the motor 2.

(ii) Two phases are selected from among the three phases of U-, V-, and W-phases, as the conduction paths to be conducted at the same time.

(iii) A combination of the two phases to be selected is switched over from UV to VW to WU, in sequence.

(iv) Further, a switching timing (off-timing) thereof is set to a timing delayed for 20-degree rotation of the motor 2 from edges (0 degree, 60 degrees, 120 degrees, . . . ) of the Hall signals.

Further, in the H/L short-circuit phase switching control, the set of two phases that are short-circuited via the conduction path is switched over per 60-degree rotation of the motor 2, as shown in FIG. 3. A short circuit occurs between the terminals of any two of the phases in a full rotation region of the motor 2. Then, a brake current flows to the two phases.

The reason why the switching timing of the two-phase short-circuit control per 60-degree rotation of the motor 2 is set to the timing delayed for 20-degree rotation of the motor 2 from the edges (0 degree, 60 degree, 120 degree . . . ) of the Hall signals is because the current flowing to each phase of the motor 2 can be sufficiently reduced at the timing.

In other words, the timing at which the current flowing to each phase of the motor 2 is zero varies depending on conditions such as a speed (induced voltage), brake current value, winding inductance of the motor 2, etc.

Therefore, in order to set the above-described switching timing to the timing at which the current flowing to each phase of the motor 2 is zero, the switching timing may be set in accordance with these conditions.

However, since the above conditions vary, it is difficult to set the above-described switching timing so that the current flowing to each phase of the motor 2 is zero without fail.

Therefore, in the present embodiment, the timing at which the current flowing to each phase of the motor 2 becomes zero under certain conditions is determined, and the determined timing is set as the switching timing. In this way, when the current that flows to each phase of the motor 2 is zero or sufficiently small, switching of the two-phase short-circuit control is performed.

Due to the above setting of the switching timing, occurrence of high voltage can be suppressed in the conduction path that is switched from a conducting state to a cutoff state. The switching element connected to the conduction path can be protected from high voltage.

Next, a two-phase short-circuit brake shown in FIG. 4 is achieved by L-side short-circuit phase switching control. In the L-side short-circuit phase switching control, a braking force is generated in the motor 2 according to steps below.

(i) The switching elements (high-side switches) Q1 to Q3 provided in the conduction path on the positive electrode side (H-side) among the switching elements Q1 to Q6 in the switching circuit 12 are turned off to cut off the conduction path on the positive electrode side (H-side).

(ii) Two of the switching elements (low-side switches) Q4 to Q6 provided in the conduction path on the negative electrode side (L-side) are turned on only for 60 degrees per 120-degree rotation of the motor 2, so that two of the conduction paths on the negative electrode side (L-side) are in a conducting state.

(iii) A combination of the two switching elements to be turned on is switched over in sequence from UV to VW to WU.

(iv) The off-timing of the switching elements to be switched from an on state to an off state by the above switching is set to a timing delayed for 20-degree rotation of the motor 2 from the edges (0 degree, 120 degrees, 240 degrees, . . . ) of the Hall signals.

In the L-side short-circuit phase switching control, as shown in FIG. 4, the two phases that are short-circuited via the conduction path on the negative electrode side (L-side) are switched over per 120-degree rotation of the motor 2. Since a short-circuit period of the two phases is a period during which the motor 2 is rotated 60 degrees, a brake current flows to the two phases in ½ range of a whole rotation range of the motor 2.

Therefore, in the two-phase short-circuit brake by the L-side short-circuit phase switching control, the braking force generated in the motor 2 can be suppressed as compared to the two-phase short-circuit brake by the H/L short-circuit phase switching control shown in FIG. 3.

In addition, the reason why the end timing of the two-phase short-circuit control per 120-degree rotation of the motor 2 is set to the timing delayed for 20-degree rotation of the motor 2 from the edges (0 degree, 120 degrees, 240 degrees . . . ) of the Hall signals is because the current flowing to each phase of the motor 2 can be sufficiently reduced at the timing.

That is, in the present embodiment, regarding the switching timing of the two-phase short-circuit brake in the L-side short-circuit phase switching control as well, as in the case of the above described H/L short-circuit phase switching control, a timing at which the current that flows to each phase of the motor 2 is zero, under certain conditions, is determined. The determined timing is set as the switching timing.

Therefore, even in the L-side short-circuit phase switching control, as in the H/L short-circuit phase switching control shown in FIG. 3, by setting the end timing of the two-phase short-circuit control, occurrence of high voltage in the conduction path that is switched from a conducting state to a cutoff state can be suppressed. The switching elements connected to the conduction path can be protected from high voltage.

Next, a two-phase short-circuit brake shown in FIG. 5, is achieved by L-side UV-phase short-circuit control. In the L-side UV-phase short-circuit control, a braking force is generated in the motor 2 according to the steps below.

(i) Among the switching elements Q1 to Q6 in the switching circuit 12, the switching elements (high-side switches) Q1 to Q3 provided in the conduction path on the positive electrode side (H-side), and a W-phase low-side switch Q6 among the switching elements (low-side switches) Q4 to Q6 provided in the conduction path on the negative electrode side (L-side), are turned off to cut off the conduction path provided with the switching elements Q1 to Q3 and Q6.

(ii) The remaining two (U-phase low-side switch Q4 and V-phase low-side switch Q5) out of the switching elements (low-side switches) Q4 to Q6 provided in the conduction path on the negative electrode side (L-side) are turned on only during 100-degree rotation per one rotation of the motor 2, so that the conduction path provided with the switching elements Q4 and Q5 is in a conducting state for a predetermined period.

(iii) The off-timing to switch the switching elements Q4 and Q5 from an on state to an off state is further set to the timing delayed by 40-degree rotation of the motor 2 from the 120-degree edge of the Hall signal.

Then, in the L-side UV-phase short-circuit control, as shown in FIG. 5, only until the motor 2 rotates 100 degrees from a falling edge (rotation position of the motor 2: 60 degrees) of the Hall signal of the W-phase per one rotation of the motor 2, the U-phase low-side switch Q4 and the V-phase low-side switch Q5 are turned on. Thus, a brake current flows to the conduction path on the negative electrode side (L-side) provided with these two switching elements.

In addition, during the above, the W-phase low-side switch Q6 is held in an off state. However, between a drain and a source of the FET constituting the W-phase low-side switch Q6, a parasitic diode exists which is in a forward direction from the source toward the drain. Therefore, through the diode, in a first half of the conduction period of the brake current, a brake current flows to the conduction path on the negative electrode side of the W-phase.

Thus, in this L-side UV-phase short-circuit control, a braking force corresponding to the brake current flowing to the conduction path on the negative electrode side of each of the U-, V-, and W-phases is generated in the motor 2. The braking force thereof can be set to a value different from values in the two-phase short-circuit brakes shown in FIGS. 3 and 4, by an amount of the brake current flowing to the W-phase.

In other words, in the L-side UV-phase short-circuit control, if time during which the brake current flows to the conduction path on the negative electrode side of the W-phase is shortened, the braking force can be reduced. If the time during which the brake current flows to the conduction path on the negative electrode side of the W-phase is increased, the braking force can be increased.

Therefore, in the L-side UV-phase short-circuit control, the braking force generated in the motor 2 can be reduced or increased, as compared with the braking forces by the two-phase short-circuit brakes shown in FIGS. 3 and 4.

The reason why setting the off-timing of the switching elements Q4 and Q5 to a timing delayed for 40-degree rotation of the motor 2 from the 120-degree edge of the Hall signal is because a current flowing to each phase of the motor 2 can be sufficiently small at the timing.

In other words, in the present embodiment, also for the off-timing of the switching elements Q4 and Q5 in the L-side UV-phase short-circuit control, just like the switching timings in the above H/L short-circuit phase switching control and L-side short-circuit phase switching control, a timing at which a current flowing to each phase of the motor 2 is zero, under certain conditions, is determined. This timing is set as the off-timing.

Therefore, even in the L-side UV-phase short-circuit control, similar to the H/L short-circuit phase switching control shown in FIG. 3 and the L-side short-circuit phase switching control shown in FIG. 4, by setting the end timing of the two-phase short-circuit control, occurrence of high voltage in the conduction path that is switched from a conducting state to a cutoff state can be suppressed. The switching elements connected to the conduction path can be protected from high voltage.

Next, in order to implement the above three types of two-phase short-circuit brake, control maps shown in FIGS. 6A, 6B, and 6C are stored in a memory (ROM or non-volatile RAM) of the control circuit 30 for each of the above two-phase short-circuit brakes.

Then, the control circuit 30 (CPU), when executing brake control by the two-phase short-circuit brake, selects the control map depending on the type of the two-phase short-circuit brake. In accordance with the selected control map, the control circuit 30 switches an on/off state of the switching elements Q1 to Q6 in the switching circuit 12. FIG. 6A shows the control map for use in the H/L short-circuit phase switching control. FIG. 6B shows the control map for use in the L-side short-circuit phase switching control. FIG. 6C shows the control map for use in the L-side UV-phase short-circuit control.

As shown in FIGS. 6A-6C, the above described control maps of the two-phase short-circuit brakes are formed by describing an on/off state (corresponding to a logical value High/Low of the driving signals) of the switching elements Q1 to Q6 per reference rotation position (0 degree, 60 degrees, 120 degrees, . . . ) of the motor 2, corresponding to an edge of the Hall signal, and a delay angle from the reference rotation position that represents a switching timing of an on/off state.

Then, the control circuit 30, in synchronization with an edge timing of the Hall signal, per 60-degree rotation of the motor 2, executes a Hall signal interruption process shown in FIG. 7A, and further, a timer interruption process shown in FIG. 7B, as required. By executing the above processes, function as the brake control unit 38 is achieved.

As shown in FIG. 7A, in the Hall signal interruption process, first in S110 (S represents a step), elapsed time from the last Hall signal interruption is acquired.

Further, in the subsequent S120, based on a signal level of the Hall signal of each of U-, V-, and W-phases, the rotation position of the motor 2 (angle: 0 degree, 60 degrees, 120 degrees, . . . ) is detected.

Then, in S130, from the control map corresponding to the type of the two-phase short-circuit brake that is currently selected, a logical value pattern of the drive signal corresponding to the rotation position of the motor 2 (on/off state of the switching elements Q1 to Q6) detected in S120 is acquired. In S140, the acquired logical value pattern is set in a setting reservation buffer. The setting reservation buffer is a memory area secured in advance in the control circuit 30.

Next, in S150, from the same control map as the map in S130, the delay angle corresponding to the rotation position of the motor 2 detected in S120 is acquired. In subsequent S160, it is determined whether or not the delay angle is 0 degree.

If the delay angle is 0 degree, there is no need to delay output of drive signals. The process proceeds to S170. Drive signals corresponding to the logical value pattern set in the setting reservation buffer in S140 are output to gates of the corresponding switching elements Q1 to Q6. The Hall signal interruption process ends.

On the other hand, when it is determined in S160 that the delay angle is not 0 degree, the process proceeds to S180. Based on the elapsed time from the last Hall signal interruption acquired in S110, and the delay angle acquired in S150, delay time until a next drive signal switching timing is calculated as a timer value.

That is, in S180, because the rotation angle of the motor 2 until the Hall signal interruption this time from the previous Hall signal interruption is 60 degrees, the delay time until the next driving signal switching timing is calculated as that "delay time=elapsed time*(delay angle/60 degrees)". The delay time is converted to the timer values (count value) for time keeping.

Then, in S190, the timer value is set to a timer register provided in the control circuit 30 to start time keeping by the timer. The Hall signal interruption process is ended.

Then, when time keeping by the timer is started in S200, timer interruption occurs after the delay time elapses.

Therefore, the control circuit 30 executes a process of S210 shown in FIG. 7B in response to the timer interruption. The drive signals corresponding to the logical value pattern set in the setting reservation buffer in S140 are output to the gates of the switching elements Q1 to Q6.

As a result, even if any one of the H/L short-circuit phase switching control, L-side short-circuit phase switching control, and L-side UV-phase short-circuit control is selected as the two-phase short-circuit brake, an on/off state of the switching elements Q1 to Q6 is switched in a control pattern corresponding to the control. A braking force corresponding to the control is generated in the motor 2.

As described above, according to the motor drive device 10 of the present embodiment, as the brake control to be performed upon braking of the motor 2, one of the all-phase short-circuit brake and three types of two-phase short-circuit brakes (H/L short-circuit phase switching control, L-side short-circuit phase switching control, and L-side UV-phase short-circuit control) can be set.

Therefore, according to the motor drive device 10 of the present embodiment, when the braking force upon braking of the motor 2 is too large with the all-phase short-circuit brake that is a conventional three-phase short-circuit brake, the user can select one of the three types of two-phase short-circuit brakes so as to achieve a desired braking force. It is possible to suppress defects in electrical equipment 100 due to excessive braking force.

Also, in the present embodiment, even with the two-phase short-circuit brake in any one of the H/L short-circuit phase switching control, L-side short-circuit phase switching control, and L-side UV-phase short-circuit control, the end timing of the two-phase short-circuit control, when ending the two-phase short-circuit control for switching the short-circuit phase, is set so that the current flowing to each phase of the motor 2 is zero or has a sufficiently small current value.

Thus, occurrence of high voltage in the conduction path to be switched from a conducting state to a cutoff state at the end timing is inhibited. The switching element connected to the conduction path can be protected from high voltage (regenerative energy).

In the present embodiment, the switching circuit 12, the control circuit 30, the Hall sensors 6 to 8, and the rotation position detecting circuit 20 correspond to an example of the braking apparatus of the present invention.

More particularly, the motor 2 corresponds to an example of the brushless motor of the present invention, the switching circuit 12 corresponds to an example of the switching circuit of the present invention, the control circuit 30 (brake control unit 38) corresponds to an example of the brake control device of the present invention, the Hall sensors 6 to 8 and the rotation position detecting circuit 20 correspond to an example of the rotation position detecting device of the present invention.

The H/L short-circuit phase switching control and L-side short-circuit phase switching control among the two-phase short-circuit brakes implemented in the braking control by the control circuit 30 (Hall signal interruption process shown in FIG. 7A and timer interruption process shown in FIG. 7B) correspond to an example of the two-phase short-circuit switching control of the present invention, and the L-side UV-phase short-circuit control corresponds to an example of the two-phase short-circuit intermittent control of the present invention.

Although an embodiment of the present invention has been described above, the present invention is not limited to the above embodiment, and can take various embodiments within the scope not departing from the gist of the present invention.

For example, in the above embodiment, as the brake control of the motor 2, one of the all-phase short-circuit brake and three types of two-phase short-circuit brakes (H/L short-circuit phase switching control, L-side short-circuit phase switching control, and L-side UV-phase short-circuit control) is selected by user operation of the braking force changeover switch 26.

This selection may be automatically performed based on the rotation speed or the like upon braking of the motor 2 by the control circuit 30.

In this way, it is possible to automatically select the two-phase short-circuit brake having low braking force (L-side UV-phase short-circuit control) during high-speed rotation of the motor 2 so as to reduce an impact applied to electrical equipment, and select the all-phase short-circuit brake having high braking force during low-speed rotation of the motor 2 so as to immediately stop the motor 2.

Also, it is not always necessary to prepare a plurality of types of two-phase short-circuit brakes, such as the H/L short-circuit phase switching control, b-side short-circuit phase switching control, and L-side UV-phase short-circuit control, as in the above described embodiment. Deceleration control of the motor 2 may be carried out by only one type of two-phase short-circuit brake from which a desired braking force is obtained.

In the embodiment described above, it is explained such that, when performing the two-phase short-circuit brake, two switching elements, from among the switching elements Q1 to Q3 provided in the conduction path on the positive electrode side or the switching elements Q4 to Q6 provided in the conduction path on the negative electrode side, are selected and turned on at the same time.

However, the parasitic diodes are present in the FETs constituting the switching elements Q1 to Q6. Depending on a current direction, a brake current can flow through the diode without turning on the switching elements.

Figure 8:
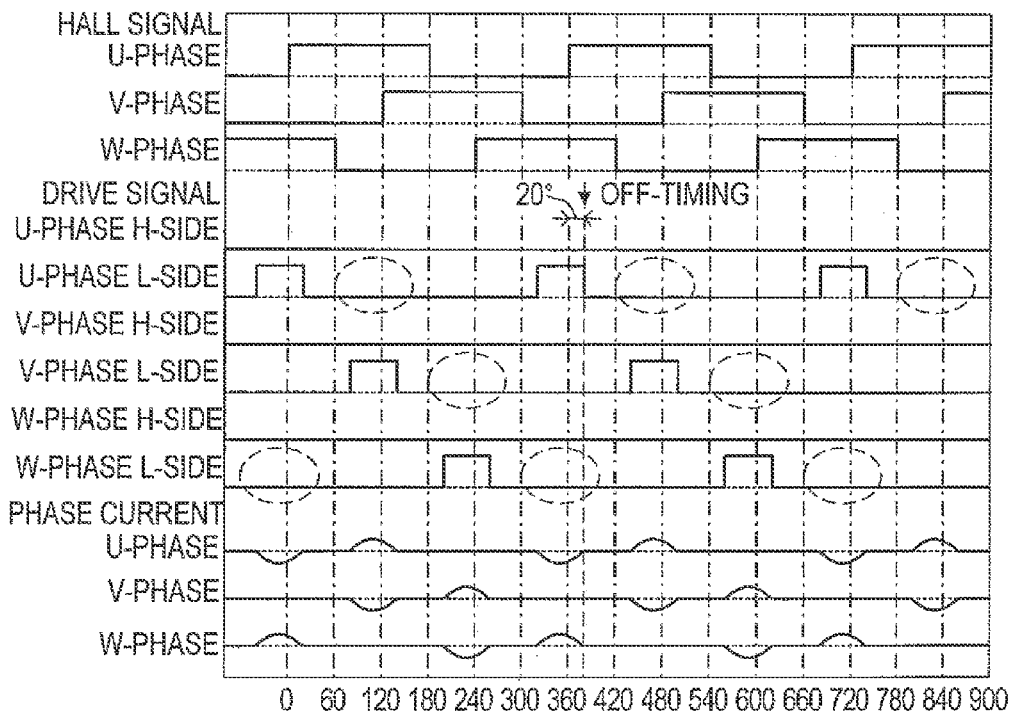
FIG. 8 is an explanatory diagram showing a variation of the two-phase short-circuit brake by L-side short-circuit phase switching control.

For example, FIG. 8 represents a control (that is, the L-side short-circuit phase switching control) in which a brake current flows in the same manner as in the L-side short-circuit phase switching control shown in FIG. 4, among the two-phase short-circuit brakes.

In the control shown in FIG. 8, only one of the switching elements of the two phases to be controlled is turned on at a control timing similar to a control timing in FIG. 4. In the conduction path provided with the other of the switching elements, a brake current flows through the diode provided with the switching element.

As above, in the two-phase short-circuit control, by turning on only the switching element provided in one out of the two conduction paths that provide conduction between the terminals of the motor 2, a brake current flows and a braking force may be able to be generated in the motor 2. In a case of implementing the present invention, such control may be selected.

Further, in the above embodiment, in the L-side UV-phase short-circuit control of the two-phase short-circuit brake, by setting an on period of the switching elements to a 100-degree rotation period of the motor 2, the brake current flows not only to the conduction path on the negative electrode side of the conducted UV-phase, but also to the conduction path on the negative electrode side of the W-phase.

By flowing a brake current to the W-phase, the braking force generated upon braking of the motor 2 is increased. However, the on period of the switching elements may be set so that the brake current does not flow to the conduction path of other phase (W-phase) that is not to be controlled.

Also, in the above embodiment, the switching timing of the two-phase short-circuit control is set based on the detection signals (Hall signals) from the Hall sensors 6 to 8 that detect the rotation position of the motor 2. The switching timing may also be set by using detection signals from other rotation sensors for rotation position detection, such as an encoder. Further, the switching timing may be set based on an induced voltage generated in each phase upon braking, or on changes in the current flowing to each phase.

Also, in the above embodiment, the control circuit 30 is a microcomputer. The control circuit 30 may be configured by combining various separate electronic parts such as a discrete element, may be an ASIC (Application Specified Integrated Circuit), may be a programmable logic device such as a FPGA (Field Programmable Gate Array), or may be a combination of the foregoing.

What is claimed is:

1. A braking apparatus for a three-phase brushless motor having three terminals, the braking apparatus comprising:

a switching circuit that includes six switching elements, the six switching elements being provided in a positive electrode side conduction path that connects the three terminals with a positive electrode side of a direct current power source and in a negative electrode side conduction path that connects the three terminals with a negative electrode side of the direct current power source, and adapted to conduct or cut off each of the positive electrode side conduction path and the negative electrode side conduction path; and a brake control device that is configured to perform braking control in which a braking force is generated in the three-phase brushless motor by controlling an on/off state of the six switching elements when one of a stop command and a deceleration command of the three-phase brushless motor is input upon rotation of the three-phase brushless motor, wherein the brake control device is configured to be able to perform two-phase short-circuit control in which an on/off state of each of the six switching elements is set in such a manner that two out of three conduction paths constituting one of the positive electrode side conduction path and the negative electrode side conduction path are in a conducting state and other of the three conduction paths is in a non-conducting state, wherein the brake control device is configured to be able to perform three-phase short-circuit control in which an on/off state of each of the six switching elements in the switching circuit is set in such a manner that the three conduction paths constituting one of the positive electrode side conduction path and the negative electrode side conduction path are brought into a conducting state and the three conduction paths constituting the other are brought into a non-conducting state, and wherein the brake control device is further configured to select one short-circuit control from the two-phase short-circuit control and the three-phase short-circuit control by user operation of a braking force changeover switch and to perform the selected one short-circuit control in the braking control.

2. The braking apparatus according to claim 1, wherein the brake control device is configured to detect a timing at which a current that flows to each phase of the three-phase brushless motor is zero as an end timing of the two-phase short-circuit control based on a rotation state of the three-phase brushless motor, and to end the two-phase short-circuit control at the detected end timing.

3. The braking apparatus according to claim 1, comprising a rotation position detecting device that is configured to detect a rotation position of the three-phase brushless motor,
wherein the brake control device is configured to perform two-phase short-circuit intermittent control in which the two-phase short-circuit control is intermittently performed in accordance with the rotation position of the three-phase brushless motor detected by the rotation position detecting device, and, when the two-phase short-circuit control is not performed, all of the positive electrode side conduction path and the negative electrode side conduction path are brought into a non-conducting state, in the braking control.

4. The braking apparatus according to claim 3, wherein the brake control device is configured to vary the braking force generated in the three-phase brushless motor, by changing an execution period of the two-phase short-circuit control in accordance with a rotation state of the three-phase brushless motor.

5. The braking apparatus according to claim 1, comprising a rotation position detecting device that is configured to detect a rotation position of the three-phase brushless motor,
wherein the brake control device is configured to perform two-phase short-circuit switching control in which the two conduction paths that are brought into a conducting state in the two-phase short-circuit control are switched in accordance with the rotation position of the three-phase brushless motor detected by the rotation position detecting device, in the braking control.

6. The braking apparatus according to claim 5, wherein the brake control device is configured to perform the two-phase short-circuit switching control by selecting the two conduction paths to be brought into a conducting state in the two-phase short-circuit control from among the three conduction paths constituting one of the positive electrode side conduction path and the negative electrode side conduction path, and switching a combination of the conduction paths to be selected in accordance with the rotation position of the three-phase brushless motor.

7. The braking apparatus according to claim 6, wherein the brake control device is configured to vary the braking force generated in the three-phase brushless motor, by changing an execution period of the two-phase short-circuit control in accordance with a rotation state of the three-phase brushless motor.

8. The braking apparatus according to claim 5, wherein the brake control device is configured to perform the two-phase short-circuit switching control, by alternately selecting the two conduction paths to be brought into a conducting state in the two-phase short-circuit control from among three conduction paths constituting the positive electrode side conduction path and three conduction paths constituting the negative electrode side conduction path, in accordance with the rotation position of the three-phase brushless motor.

9. The braking apparatus according to claim 8, wherein the brake control device is configured to vary the braking force generated in the three-phase brushless motor, by changing an execution period of the two-phase short-circuit control in accordance with a rotation state of the three-phase brushless motor.

10. The braking apparatus according to claim 5, wherein the brake control device is configured to vary the braking force generated in the three-phase brushless motor, by changing an execution period of the two-phase short-circuit control in accordance with a rotation state of the three-phase brushless motor.

11. Electrical equipment comprising:
a three-phase brushless motor having three terminals;
a switching circuit that includes six switching elements, the six switching elements being provided in a positive electrode side conduction path that connects the three terminals with a positive electrode side of a direct current power source and in a negative electrode side conduction path that connects the three terminals with a negative electrode side of the direct current power source, and adapted to conduct or cut off each of the positive electrode side conduction path and the negative electrode side conduction path;
a brake control device that is configured to perform braking control in which a braking force is generated in the three-phase brushless motor by controlling an on/off state of the six switching elements when one of a stop command and a deceleration command of the three-phase brushless motor is input upon rotation of the three-phase brushless motor; and
a braking force changeover switch,
wherein the brake control device is configured to be able to perform two-phase short-circuit control in which an on/off state of each of the six switching elements is set in such a manner that two out of three conduction paths constituting one of the positive electrode side conduction path and the negative electrode side conduction path are in a conducting state and other of the three conduction paths is in a non-conducting state,
wherein the brake control device is configured to be able to perform three-phase short-circuit control in which an on/off state of each of the six switching elements in the switching circuit is set in such a manner that the three conduction paths constituting one of the positive electrode side conduction path and the negative electrode side conduction path are brought into a conducting state and the three conduction paths constituting the other are brought into a non-conducting state, and
wherein the brake control device is further configured to select one short-circuit control from the two-phase short-circuit control and the three-phase short-circuit control by user operation of the braking force changeover switch and to perform the selected one short-circuit control in the braking control.

* * * * *